(12) United States Patent
Seymour (10) Patent No.: US 9,251,712 B2
(45) Date of Patent: Feb. 2, 2016

(54) METHOD AND APPARATUS TO ENCOURAGE DEVELOPMENT OF LONG TERM RECOLLECTIONS OF GIVEN EPISODES

(75) Inventor: Leslie G. Seymour, Barrington, IL (US)

(73) Assignee: Persinvitro LLC, Barrington, IL (US)

( * ) Notice: Subject to any disclaimer, the term of this patent is extended or adjusted under 35 U.S.C. 154(b) by 907 days.

(21) Appl. No.: 12/049,789

(22) Filed: Mar. 17, 2008

(65) Prior Publication Data

US 2008/0227067 A1  Sep. 18, 2008

Related U.S. Application Data

(60) Provisional application No. 60/895,478, filed on Mar. 18, 2007.

(51) Int. Cl.
*G09B 19/00* (2006.01)
*G09B 5/00* (2006.01)

(52) U.S. Cl.
CPC ........................ *G09B 5/00* (2013.01)

(58) Field of Classification Search
USPC ................................................. 434/236, 238
See application file for complete search history.

(56) References Cited

U.S. PATENT DOCUMENTS 5,596,994 A      1/1997  Bro
6,088,026 A *    7/2000  Williams ...................... 715/202
7,294,107 B2 *  11/2007  Simon et al. .................. 600/300

2003/0002390 A1   1/2003  Sellen et al.
2004/0148453 A1 * 7/2004  Watanabe et al. ................. 711/1
2005/0227218 A1 * 10/2005  Mehta et al. .................. 434/350

FOREIGN PATENT DOCUMENTS

KR    10-2006-0068143    6/2006

OTHER PUBLICATIONS

International Search Report from PCT/US2009/036528; Dated: Oct. 13, 2009.

* cited by examiner

*Primary Examiner* — Sam Yao
*Assistant Examiner* — Evan Page
(74) *Attorney, Agent, or Firm* — Fitch Even Tabin & Flannery LLP (57) ABSTRACT

These teachings are applicable for use with an individual who faces problems with respect to forming new long term memories. Generally speaking, pursuant to these various embodiments, one automatically captures (101) a record of experiential content to which the individual is exposed during a given episode and then automatically associates (102) that record of experiential content with metadata that characterizes the given episode. This record of experiential content is then automatically used (103) to re-expose the individual to at least portions of the given episode to thereby encourage development of a long term recollection of at least a portion of the given episode. These teachings will accommodate a variety of experiential content modalities including both audio content and visual content.

10 Claims, 5 Drawing Sheets

METHOD AND APPARATUS TO ENCOURAGE DEVELOPMENT OF LONG TERM RECOLLECTIONS OF GIVEN EPISODES

RELATED APPLICATION(S)

This application claims the benefit of U.S. Provisional application No. 60/895,478 filed Mar. 18, 2007, which is incorporated by reference in its entirety herein.

TECHNICAL FIELD

This invention relates generally to the encouragement of long term recollections and more particularly to the at least partially automated encouragement of long term recollections.

BACKGROUND

Human memory is often viewed as comprising both short term memory and long term memory. Short term memory refers to that which an individual can recall within a few seconds to a few minutes of being exposed to a given experience. This kind of memory tends to degrade quickly. Long term memory, on the other hand, refers to that which an individual can recall for a much longer period of time following the aforementioned exposure; this can be hours, days, or years.

These are not merely semantically-based categorizations. Short-term memory is presently viewed as being supported by transient patterns of neuronal communication that are dependent on regions of the frontal lobe (and in particular the dorsolateral prefrontal cortex) and the parietal lobe. Long-term memories, on the other hand, are presently viewed as being maintained by more stable and permanent changes in neural connections that are widely spread throughout the human brain.

The ability to develop new long term memories can become impaired for any number of reasons. Various illnesses can have this effect as can other physical impairments of various kinds. Similar impairment can occur with individuals who experience considerable cognitive loading, emotional distress, and so forth. In some cases the problem can be relatively fully developed almost immediately and in other cases can develop gradually over an extended period of time. In any event, an inability to reliably develop new long term memories can be highly problematic for a given individual as well as those with whom that individual interacts.

BRIEF DESCRIPTION OF THE DRAWINGS

The above needs are at least partially met through provision of the method and apparatus to encourage development of long term recollections of given episodes described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

These teachings are applicable for use with an individual who faces problems with respect to forming new long term memories (which is also often ironically referred to as a short term memory problem). Generally speaking, pursuant to these various embodiments, one automatically captures a record of experiential content to which the individual is exposed during a given episode and then automatically associates that record of experiential content with metadata that characterizes the given episode. This record of experiential content is then automatically used to re-expose the individual to at least portions of the given episode to thereby encourage development of a long term recollection of at least a portion of the given episode. These teachings will accommodate a variety of experiential content modalities including both audio content and visual content.

By one approach, automatically associating the record of experiential content with metadata can comprise automatically associating the record of experiential content with calendar information as pertains to the individual. By one approach, the aforementioned re-exposure of the individual to portions of the given episode can occur within a relatively short period of time following a conclusion of that episode.

The particular portions of the given episode to which the individual is so re-exposed can vary with respect to various criteria of interest. This can include information regarding available time, a degree of similarity or dissimilarity as between various portions of the given episode and previous episodes and/or anticipated future episodes. Such criteria can also influence whether, as well as how, to re-expose the individual at all to some or all of the record of experiential content. Numerous other possibilities exist in these regards as well.

Figure 1:
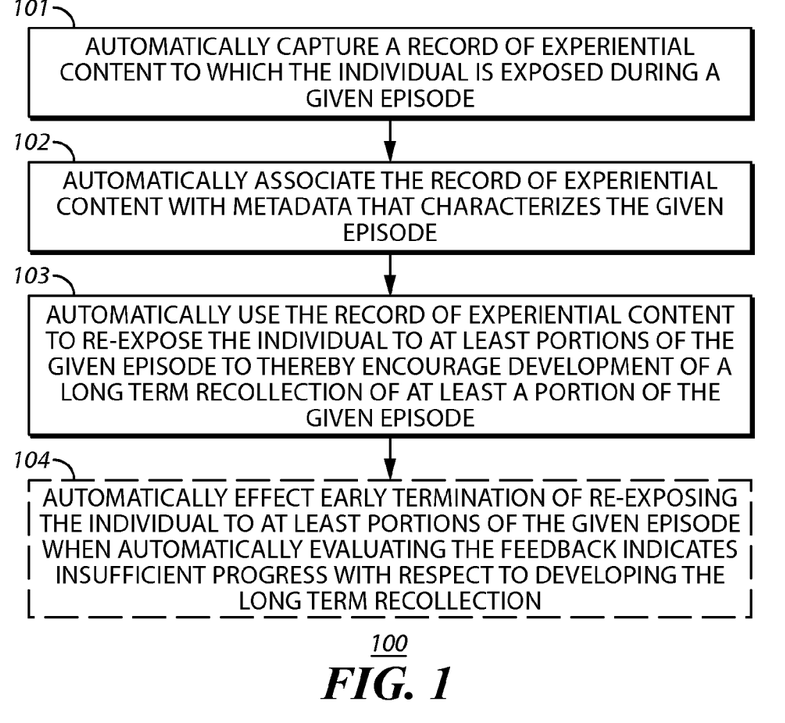
FIG. 1 comprises a flow diagram as configured in accordance with various embodiments of the invention.

So configured, those skilled in the art will recognize and appreciate that these teachings are readily implemented in ways that leverage commonly available technology and methodologies. It will further be appreciated that these teachings are readily scaled and can accommodate a range of application settings. Accordingly, these teachings are suitable for use with a range of degrees of memory impairment These and other benefits may become clearer upon making a thorough review and study of the following detailed description. Referring now to the drawings, and in particular to FIG. 1, an illustrative process that is compatible with many of these teachings will now be presented.

This process 100 provides for automatically capturing 101 a record of experiential content to which a given individual is exposed during a given episode. This can comprise a record of, for example, audio content, visual content (including both still images and video content), and so forth) and can be as rich, or sparse, as desired. By one approach, for example, a still image in the vicinity of the individual can be captured on a periodic basis. This might comprise, for example, capturing a digital photograph every X seconds or every Y minutes. By another approach, and still by way of example, part or all of the capturing process can be triggered by non-temporal factors. These might include, for example, certain ambient volume levels, voice recognition and/or speaker recognition-based triggers, location-based triggers, and so forth.

By one approach, all of the captured images can correspond to a fixed point of view. For example, the image capture device might be mounted in a fixed manner on the individual's wheelchair. By another approach, the image capture device can be provided with an ability to alter (either automatically or under remote control) its directionality. The latter would permit, for example, the image capture device to automatically direct itself in order to capture images in a direction from which sounds are emanating. It will also be understood that a plurality of image capture devices and/or audio recorders can be employed as desired.

By one approach, this automated capture of experiential content can comprise an ongoing activity. By another approach, if desired, this activity can be scheduled to coincide with the given episode itself. For example, the individual's calendar may include this episode as a scheduled event and this capturing step can occur as an automated consequence of that scheduling.

This process 100 then provides for automatically associating 102 this record of experiential content with metadata that characterizes the given episode. By one approach, for example, the captured content can be synchronized to a running time/date code. This, in turn, would permit a playback of various modalities of captured content, such as video and audio, in synchronicity with one another. This time/date code could also be used in various ways to facilitate other steps as are presented below.

There are numerous other examples of metadata than can be usefully considered in this context. By one approach, this metadata can include location information such as global positioning system (GPS)-derived information or beacon-based location information as may be available in certain application settings. By another approach, if desired, this metadata can comprise data and readings as provided, for example, by medical sensory devices as are attached to the individual. The information provided by such device readings can include, but is not limited to, heart rates, blood pressure, perspiration, blood sugar levels, and so forth. Such information can be potentially helpful in a variety of application settings, either in support of the purposes of these teachings or for other separate and discrete purposes.

By one approach, this step of automatically associating the record of experiential content with metadata can comprise, at least in part, automatically accessing a calendar for the individual and using information in the calendar as the metadata. An example in this regard might comprise, for example, noting that the individual is scheduled for a doctor's appointment from 3 PM to 4 PM and automatically tagging content in the record as was captured during that period of time as corresponding to an episode at this particular doctor's offices.

This process 100 then provides for automatically using 103 the record of experiential content to re-expose the individual to at least portions of the given episode to thereby encourage development of a long term recollection of at least a portion of the given episode. This could comprise, if desired, re-exposing the individual to the complete record as pertains to this given episode. By another approach, however, this could comprise automatically abridging the record of experiential content that is to be re-exposed to the individual by, at least in part, reducing a re-exposure to redundant experiential content. As one simple example in this regard, this might comprise automatically comparing the content of a collection of still images as comprise a part of the record as pertains to a given episode and discarding redundant images that do not appear to contribute any additional content over and above another image that is to be re-exposed to the individual.

As another example in this regard, at least portions of the record for a given episode can be automatically compared to the record for previously recorded episodes. In this case, and again, purely (or largely) redundant images can be pared down to a fewer representative number to be re-exposed to the individual. This approach can be particularly useful when re-exposing the individual to the record comprises not only re-exposing the individual to a single episode (such as a particular visit to the doctor's office) but to a plurality of similar, related episodes (such as each of this individual's last three visits to the doctor's office).

By one approach, this step of automatically re-exposing the individual to such content can comprise, at least in part, re-exposing the individual to at least portions of the given episode within a relatively short period of time following a conclusion of the given episode. This might comprise, for example, re-exposing the individual to this material within, say, five minutes to one hour following the conclusion of the given episode.

By one approach, the foregoing can further optionally comprise determining an extent of re-exposing the individual to such content within this relatively short period of time following the conclusion of the given episode. This, in turn, can comprise taking into account future scheduled episodes (including, for example, future scheduled episodes having at least a given amount of similarity to the given episode).

As one example in this regard, when the individual is scheduled to meet with this same doctor two hours later, it may be appropriate to modulate and select the re-exposure content to be some relatively smaller amount of content (such as, for example, content that can likely be assimilated within about fifteen minutes). As another example in this regard, when the individual is scheduled to be engaged in another completely different episode within thirty minutes, and when it would require, for example, one hour of time to properly assimilate the material, this determined extent of re-exposure may be zero; that is, it may be determined to not effect re-exposing the individual to this content at this time.

Such a determination may be based, for example, upon a determination that re-exposing the individual at this time, or with this content, or under these circumstances, given the time and/or other resources available, will (or will not) likely sufficiently aid this individual with respect to encouraging the development of their long term recollection.

In the examples just provided, a determination was being made regarding whether to re-expose the individual to the record as corresponds to a given episode within a relatively short period of time following the conclusion of that episode. These teachings will also accommodate, however, making a determination regarding re-exposing the individual to at least portions of the given episode shortly prior to the individual being exposed to a subsequent similar episode. This can comprise, for example, re-exposing the individual to at least portions of other previously captured episodes as a function, at least in part, of a determined degree of similarity between the given episode and the subsequent similar episode.

Such a determination may be based upon the content of the record for the given episode and/or upon the metadata as corresponds thereto. For example, information regarding the subsequent similar episode (which might be gleaned, for example, from the aforementioned calendar for the individual) can be compared against the metadata for the given episode to determine a relative degree of similarity or dissimilarity. Such an approach can serve well, for example, to aid in automatically identifying past recorded content that may be useful in helping to refresh the recollections of the individual prior to their experiencing, in real life, the subsequent similar episode. By one approach, such metadata can be derived from the calendar of events that has been explicitly annotated with such metadata (by noting, for example, the persons attending the event as identified by their name, their title, their relationship to the individual, their particular function as a caregiver, and so forth). By another approach, if desired and feasible, face recognition and speaker recognition techniques can be utilized to identify persons, amend the metadata and/or comparte previously recorded content metadata to the content of the subsequent episode.

By one approach, this step of automatically using the record of experiential content to re-expose the individual as described can comprise a passive activity for the individual. In this case, no particular response from the individual is expected and/or required. By another approach, however, this step can comprise, in whole or in part, an active activity where responses from the individual are solicited and/or required. In this case, if desired, this step can further optionally comprise receiving feedback from the individual with respect to the record of experiential content to which the individual is being re-exposed and then automatically evaluating the feedback, at least in part, by comparison with the metadata.

When eliciting feedback on either a required or an optional basis, this process 100 will also optionally accommodate, if desired, automatically effecting (104) early termination of the re-exposure process when the feedback indicates insufficient progress with respect to developing the long term recollection. Such an action can potentially aid with respect to avoiding undue frustration on the part of the individual.

By one approach, this early termination decision can also utilize additional metadata such as medical sensory readings that were gained during the original content capture process and/or in the process of re-exposing such content to the subject. For example, blood pressure, heart-rate, or perspiration sensory readings, or the combination of such readings, can indicate a state of undue frustration.

By another approach, if desired, a determination of a likelihood of undue frustration on the part of the individual can also be derived from persona model components of the subject. Such components, can include for example, cognitive skills which indicate the subject's difficulties in recognizing faces and/or voices (a condition or circumstance that may or may not be related to the condition of impaired long term memory retention for personal experiences). Another such included persona model component can comprise interests and incentives as pertain to the subject. This can comprise, for example, understanding and taking into account the subject's likely frustration if the subject has absolutely no interest in certain calendar events, participating persons, and so forth.

Yet another potentially applicable persona model component is the affective state, which also can indicate undue frustration as derived, for example, from either the aforementioned medical sensory reading values or by applying facial expression and/or voice analysis pattern recognition techniques. Finally, the personality traits component of many persona models can comprise yet another source of detecting and/or predicting undue frustration. For example, the lack of the so-called "openness" personality trait is likely to correlate with an undue frustration state when combined with forced attendance at a calendar event that will unexpectedly expose the subject to an entirely new experience.

Figure 2:
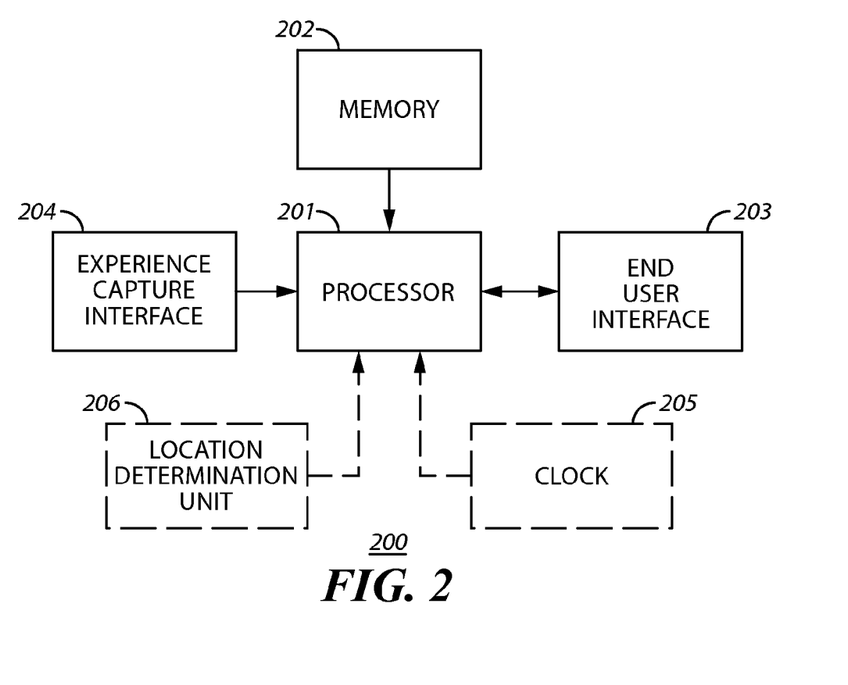
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

In this illustrative (and generalized) example, the enabling apparatus 200 comprises a processor 201 that operably couples to a memory 202, an end user interface 203, and an experience capture interface 204. Those skilled in the art will recognize and appreciate that such a processor 201 can comprise a fixed-purpose hard-wired platform or can comprise a partially or wholly programmable platform. All of these architectural options are well known and understood in the art and require no further description here.

The memory 202 can serve to store, temporarily or permanently, such items as the aforementioned record of experiential content for one or more corresponding episodes, operating instructions to be employed by the processor 201 when carrying out one or more of the described steps, the aforementioned metadata, and such items as the aforementioned calendar for the given individual. Those skilled in the art will recognize that this "memory" can comprise a single component if desired or can comprise a distributed approach that includes a plurality of discrete memory components. It will also be understood and appreciated that this memory may be partially or wholly local to the apparatus 200 as suggested by the illustration or may be located remotely therefore (in which case FIG. 2 can be viewed as presenting a logical view of the apparatus as versus a physical view).

Figure 3:
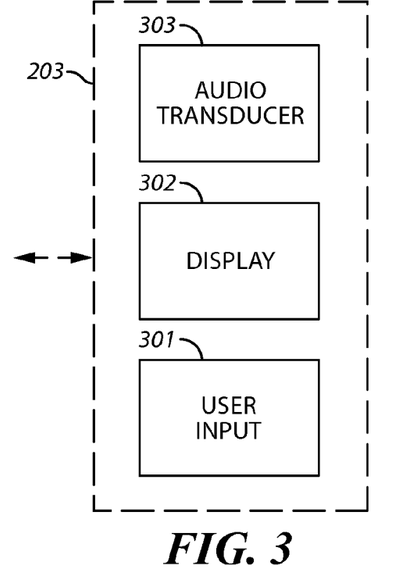
FIG. 3 comprises a block diagram as configured in accordance with various embodiments of the invention.

The end user interface 203 can vary with the needs of the individual as well as the needs and/or opportunities presented by a given application setting. Referring momentarily to FIG. 3, for example, this end user interface 203 can comprise a user input 301 to permit the individual to provide instructions, responses, or the like to the apparatus. This user input 301 can comprise, for example, any of a keyboard, a keypad, a cursor control device, a voice recognition-based input, and so forth.

This end user interface 203 can also comprise user output mechanisms such as, by way of illustration, a display 302 and an audio transducer 303. The display 302 can comprise any of a wide variety of displays including but not limited to liquid crystal displays, cathode ray tube displays, light emitting diode-based displays, plasma-based displays, and so forth. The audio transducer 303, in turn, can similarly comprise a variety of enabling approaches including free space speakers, headphones, and so forth.

Referring again to FIG. 2 (and also momentarily to FIG. 4), the experience capture interface 204 can serve to compatibly receive content from a video capture platform 402 and an audio capture platform 401. There are numerous options for both such platforms as will be well understood by those skilled in the art. Examples for the video capture platform 402 would include, but are certainly not limited to, various digital methodologies for still and video content such as JPEG, MPEG 2, MPEG 4, and so forth. Similarly, the audio capture platform 401 can comprise, by way of example, an MPG3-compatible platform but again, numerous options exist in this regard. These teachings could also be applied in conjunction with non-digital methodologies but digital capture (and the ease by which such content can be digitally stored) is probably preferable for a large number of application settings.

Referring now only to FIG. 2, this apparatus 200 can of course include other components as may be useful in a given application setting. Two illustrative examples are a clock 205 (such as a time of day clock) and a location determination unit 206 (such as a global positioning system (GPS)-based location determination unit as are known in the art). Such components, when optionally provided, can also be operably coupled to the processor 201 to facilitate the actions and functionality of the processor 201 in accordance with these teachings.

By one approach, this processor 201 can be configured and arranged (for example, via corresponding programming as will be well understood by those skilled in the art) to carry out one or more of the steps, actions, and/or functionality as has been set forth herein. This can comprise, for example, configuring the processor 201 to facilitate the automatic capture (via the experience capture interface 204) of a record of experiential content to which a given individual is exposed during a given episode and the storage of that record in the memory 202, automatic association of the record of experiential content with metadata that characterizes the given episode, and automatic use of this record of experiential content to re-expose the individual, via the end user interface 203, to at least portions of the given episode to thereby encourage development of a long term recollection of at least a portion of the given episode.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

For the sake of example a more detailed instantiation that accords with these teachings will now be provided. Those skilled in the art will appreciate and recognize that the presentation of such details is intended to serve only as an illustrative example and is not intended to serve as an exhaustive or otherwise limiting example in this regard.

Figure 5:
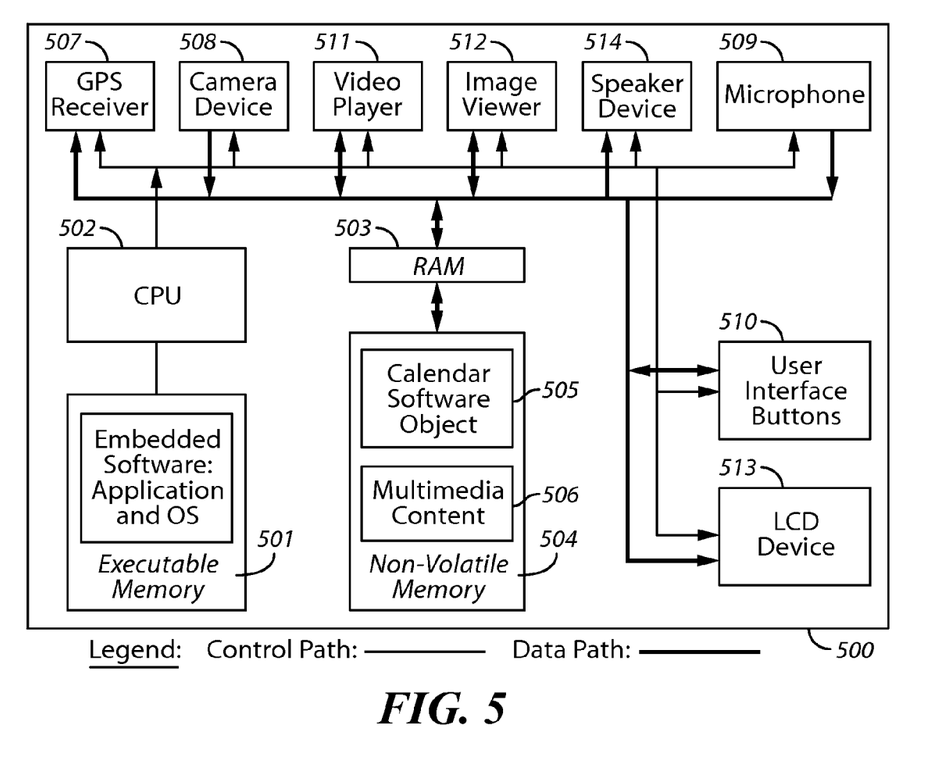
FIG. 5 comprises a block diagram as configured in accordance with various embodiments of the invention.

In this illustrative example, and referring now to FIG. 5 the enabling platform comprises a mobile device 500 that comprise an executable code storage 501 that contains the instructions necessary to perform the various functions described herein. These instructions are performed by a Central Processing Unit (CPU) 502 that works in tandem with a Random Access Memory (RAM) which serves as working storage area. In this illustrative embodiment a non-volatile memory 504 stores a programmable calendar 505 and multimedia content 506 that comprises the record of the episode(s) experienced by the subject using the mobile device 500.

This logged multimedia content 506 (which includes at least a portion of the aforementioned metadata as well) is received and provided by a Global Positioning System (GPS) receiver 507, a Camera 508, a microphone 509, and control buttons of a user interface 510 of the mobile device 500. Visual portions of the multimedia content 506 can be played back using a video player 511 and an image player 512 in conjunction with a Liquid Crystal Display (LCD) 513. Audio portions of the replayed content as well as voices instructions for the mobile device user are replayed through a speaker and speaker driver 514 of the mobile device 500.

Those skilled in the art will recognize and understand that such a mobile device 500 can be readily enabled in a highly portable and integrated form factor that can be easily carried, if desired, on the person. Such a mobile device 500 could also be readily configured in a form factor that is suitable to be attached, for example, to a personal conveyance mechanism such as a wheelchair, a gurney, a walker, and so forth. Other possibilities of course exist in this regard as well.

Figure 6:
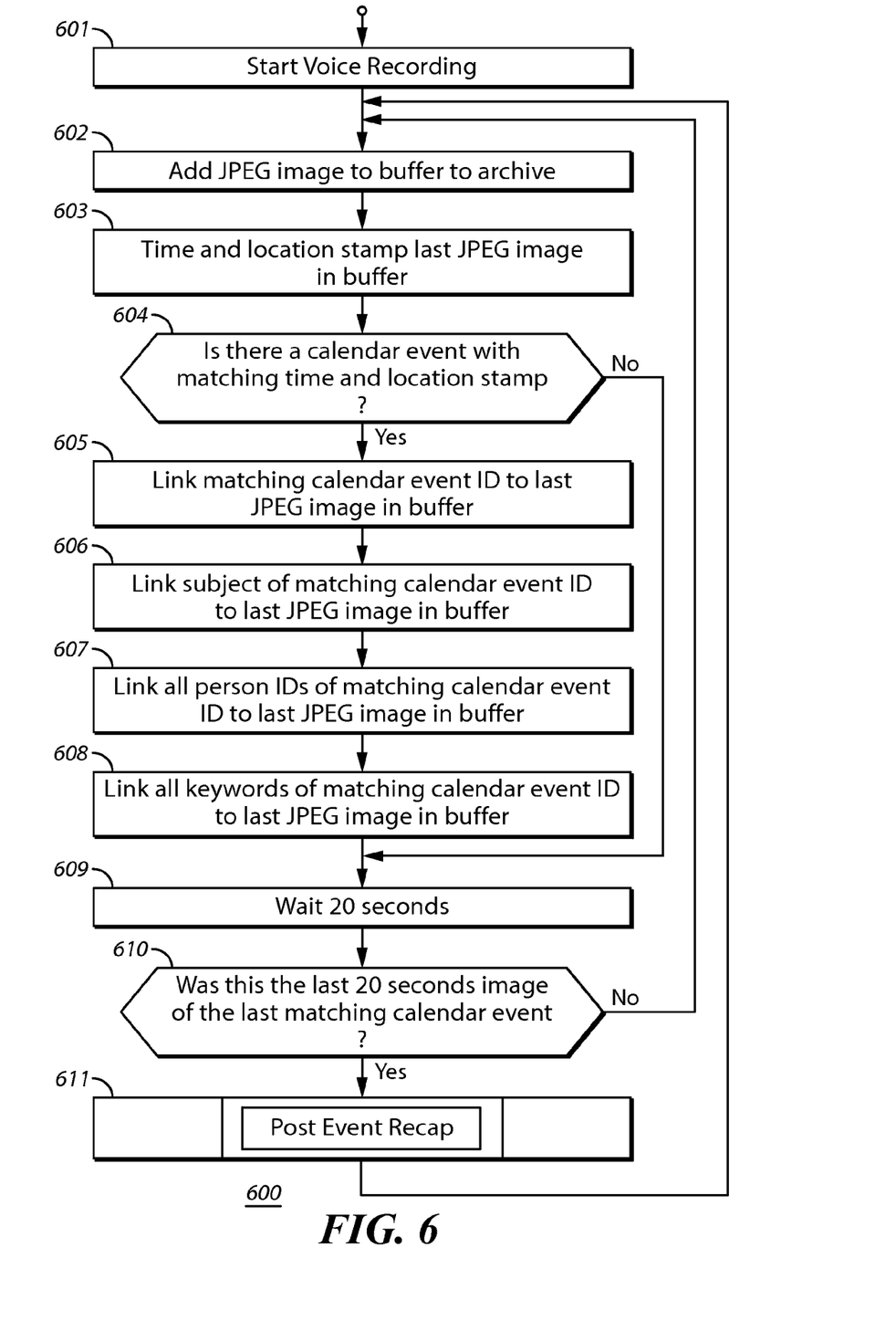
FIG. 6 comprises a flow diagram as configured in accordance with various embodiments of the invention.

Referring now to FIG. 6, an illustrative example as pertains to a process 600 to capture the content of an episode experienced by the subject and link the logged content to a current calendar event stored in the user's mobile device 500 will be described. In a first step 601, and via the aforementioned microphone 509, the mobile device 500 starts recording everything that the user of the mobile device is likely hearing. In a second step 602, the camera 508 of the mobile device 500 takes a picture of what the user likely sees and the device 500 captures the JPEG code for this image in the non-volatile memory 504 of the device 500. At the same time, the mobile device 500 resets a timer for a picture taking sampling rate period, the termination of which is determined in a later step.

At step 603, the captured JPEG image is amended with (and/or other linked to or associated with) metadata information specifying a corresponding geographic location and date/time stamp of the captured and logged image. The location stamp is derived by the device by reading the latitude/longitude/elevation values of the mobile device's GPS receiver 507. The date and time stamp in the image metadata can be derived from the systems clock in the CPU 502 or possibly also from the GPS receiver 507.

In a next step 604, the process 600 checks in the device calendar 505 to determine if there is any prerecorded calendar event with a location and/or date and time data matching the metadata assigned to the JPEG image stored in the previously described step 603. When true, then in a following step 605 the last recorded and saved JPEG image is also linked to this matching calendar event. For example, if the user of a wheelchair-mounted mobile device 500 was being visited by his sister and at the time of taking the first picture the device's GPS location and time determination matched the date and time as well as the location of a family visit episode recorded that was scheduled in the user's mobile device calendar 505, then the last recorded image is linked to this family visit episode.

By one approach an error range can be established for use when making this determination. This error range can depend on any number of factors, including but not limited to the GPS sensory error, the size and/or relative complexity of the facility where the predetermined, anticipated episode is taking place, the type of event, who is participating at the event, and so forth. By one approach, for example, a given item of recorded content can be associated with metadata that links the recorded content to more than only one possible candidate episode. It would also be possible to include one or more weighting factors in the metadata and/or the link in order to indicate a relative degree of confidence regarding the likelihood that a given particular item of stored content in fact corresponds to a given time, place, episode, person, or the like.

When this process 600 does not find a matching event in the calendar for the last recorded image, the process 600 then proceeds to step 609 to wait for the completion of the current sampling period before capturing the next image to record in JPEG format in the log memory of the mobile device 500. Steps 602 through 604 (along with the steps that pertain to determining completion of the current sampling period) are repeated until a matching calendar event is found.

In the mean-time, the captured pictures are recorded and retained as JPEG images in the device memory 504, but are not linked to any calendar event. How long such "dangling" image sequences are retained in the device's memory 504 can depend on a number of factors, including but not limited to: the memory capacity of the device 500; whether the device 500 has wired or wireless connections to remote external storage (such as, for example, a wheel-chair-mounted external storage module); whether the solution is equipped to store and retrieve content not explicitly matched with calendar registered events; and/or whether the solution is equipped with content mining functionality of recognizing content semantics, such as type of events, persons in the image, and so forth, to note but a few examples in this regard. Decisions regarding handling of these dangling content sequences can thus also be driven by policies provisioned on the device 500 at the time of configuring the system.

In steps 605 through 608, the saved image is linked to all signifying attributes of the matching calendar event, including but not limited to an identifier (ID) (or identifiers) or event index that uniquely identifies the episode itself and optionally, other attributes of the episode. These optional, other attributes may include the subject of the episode (for example, "family visit), identifiers for persons associated with the event (for example, the name of a visiting sister), other optional keywords or attributes (such as, for example, "birthday" or "medical appointment"), one or more recurring attributes (such as, for example, "every other Sunday afternoon"), and so forth.

Event attributes may not have to be explicitly recorded with the retained image as separate metadata information, since the calendar event record itself is likely to have them already. By doing so however, the implementation could likely support more efficient search techniques at retrieval time, and may utilize parameters that are easily determined at the time of the episode but not later necessarily at a subsequent time when searching is required.

While the voice and sound were continuously being recorded and the last captured image was analyzed for event match and recorded in the event content storage, at step 609 the device 500 waits for the completion of a 20 second period (or a similar, preconfigured, length of period of time having a duration of choice) before capturing a next JPEG image of what the user of the device 500 sees.

At step 510, the process 600 determines if the currently captured image comprises the last image associated with the matching selected event. For example, if the duration of the event is marked as 30 minutes in the calendar and this was the $90^{th}$ captured image when using 20 second intervals, the conclusion of the completed event can be reasonably ascertained.

Those skilled in the art can apply modifications and improvements here by setting up specific configuration policies for employing more complex decision-making criteria to terminate the event-related content capturing. Such policies may include factors such as explicit manual input to terminate the event by using tactile or touch-screen buttons on the device 500 or somewhere else on the wheel-chair, using manual remote control buttons, the distance in time and location of the next event recorded in the calendar, the use of pattern recognition algorithms to analyze the captured content (such as scene change detection algorithms, or algorithms detecting changes in the number and/or identities of the people attending the event), and so forth, to note but a few relevant examples in this regard.

If in step 610 the process 600 determines that more images are anticipated to match the current event, the process 600 returns to step 602 to facilitate capturing and linking the next image of the episode. Otherwise, the process 600 concludes that the content capturing part of the current calendar event has been completed and hence begins a so-called "Post-Event Recap" function.

Figure 7:
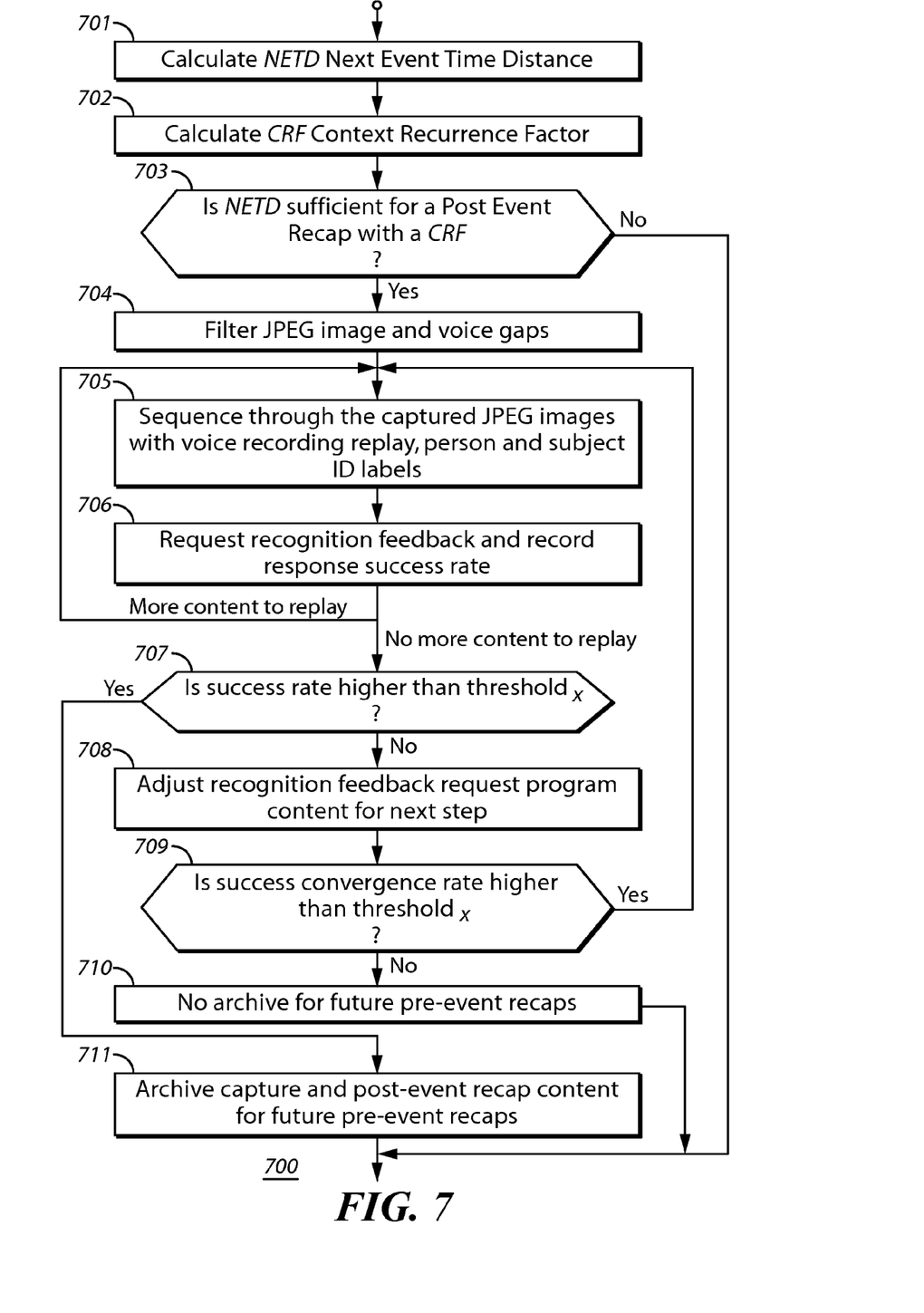
FIG. 7 comprises a flow diagram as configured in accordance with various embodiments of the invention.

Referring now to FIG. 7, the Post-Event Recap process 700 begins with Step 701 where the NETD (Next Event Time Distance) is calculated. For example, if the last family visit event ended at 3:30 PM (which is also the current time) and the calendar indicates a scheduled 4:15 PM doctor's visit appointment event, the NETD value is 45 minutes (calculated in this example by subtracting the current time of 3:30 PM from the doctor's visit event start of 4:15 PM).

Next, in step 702, a CRF ("Context Recurrence Factor") value is calculated. First, recurrent events are located and linked to the last completed and recorded episode. The factors used for locating recurrent events can be the same factors that are used for tagging the recorded experience content entities, including but not limited to location data, time and date, episode subject, and event participants. Recurring event linkage policies are used as functions of these factors for locating the events to be linked to the just completed and now being recapped event.

It may be noted that events can also be later stored in the calendar after the current event is completed and recapped. In such a case, newly inserted events can be retroactively included in the recurrence linkage list using the same policies as were used for linking recurrent events already in the calendar at the time of completion of the episode to be recapped. In case such latent recurrent events are introduced to the calendar, the CRF value determined here may also require updating to reflect the additional complexities introduced by involving a new recurrent event.

Those skilled in the art will recognize that the CRF value signifies the level of complexities involved in verifying if all necessary content components of a last completed episode have been sufficiently and correctly retained in the user's long term memory in order to permit likely reuse of those memories in future, related episodes that can be qualified as recurrent events. One simple way of determining what these future recurrent events are and how many such events are expected (and with what frequency) is to use the "recurrence" attribute of the last completed event as recorded in the mobile device 500. For those skilled in the art, other, more indirect methods would include "event-content mining" algorithms that look for future event definitions with attributes similar to the completed event.

The attributes of the last completed "reference" event can be explicitly assigned to the last event in the calendar or these can also be discovered by "pattern matching" content mining algorithms analyzing the captured content in optional relations to the event attributes recorded in the calendar.

There are several component factors related to the completed episode that can impact the complexity measure factor CRF. These include, but are not limited to, the number and complexity of the attributes of the completed event, the length of the completed event, variations in the captured content associated with the completed event, and so forth. The higher these component factor values are, the higher the value that assigned as the CRF value.

The CRF value can also depend on the complexities of the associated recurrent events. The more of these recurrent events there are, the higher the corresponding CRF value. The complexities of the recurrent events and the anticipated content and attribute overlap between the completed and the recurrent anticipated events can also serve to increase the value of the CRF.

By one approach, the CRF value is calculated following policies that are determined prior to provisioning the device 500 for a specific application context, which can depend, for example, on the physical and/or mental condition of the user, the personality and/or interests of the user, on the specifics of the services provided by a care-giver and on the equipment, processes and services of the care-giver facility, and so forth.

As illustrated, the CRF value is employed in step 703 to determine whether sufficient time is available (as represented by the NETD value) to effect a useful post event recapping process. This can comprise, for example, mapping the CRF value into a range of time periods needed for the content recapture process to be conducted with the user as it relates to the completed event and to the anticipated recurring events. One reason for applying a range of durations of the recapture process as versus only a single duration value is the difference in the degree of the recapture fidelity that can be achieved in the subsequent steps of the recapture process 704 through 709. In particular, the more comprehensive the content recapture process (with respect to substantive details and in terms of coverage), the longer it will likely take to effectively re-expose the individual to this information in a useful manner.

The minimum required duration value represents a recapture process that would be usefully required for making a positive impact on improving the long term memories as pertain to the completed episode experience. The maximum duration, in turn, represents a level of details and coverage of the captured content of the last completed episode that would not feasibly require or benefit from further increase (because further increasing available time would not significantly contribute to any further memorization improvements). Such a saturation level may be attributed to the semantical richness of the captured content in and of itself and/or to one or more personal limits as pertain the users. Examples in this regard might include a quantity of material that exceeds a cognitive overload threshold for the individual that can not be overcome without, for example, some significant rest period for the individual. Repeated post-event recap strategies with breaks and other intervening events are also feasible and can be routinely applied by those with skills in the art based on these teachings.

If the minimum duration of the anticipated recapture process associated with the CRF value is less than the previously determine NETD time distance value, then the time remaining to the next episode is determined at step 703 to be not sufficient to conduct any meaningful content recapture. In this case, the actual post-event recap process core can be terminated and this process 700 can automatically conclude.

When the calculated NETD duration is sufficient, however, to conduct a meaningful recapture process, the process 700 proceeds to step 704 where redundant JPEG images and voice gaps are filtered. In this step, an image comparison algorithm first determines if the difference between two consecutive images is bigger than a specific statistical threshold value. If not, the two adjacent images are considered similar enough and the second one is a candidate to be filtered out. Before removing the image, however, the voice track can be checked to determine if there was any significant voice track traffic while the second image was capturing.

If no significant differences were detected between the two images and no significant voice traffic spans the two images, then the second image is filtered out in this illustrative example. When there is significant voice track traffic corresponding to the first image was recorded, however, the first image display duration can be adjusted in the filtered content to last at least until the voice track traffic is significant or until a significantly different subsequent image is encountered, whichever occurs first. While the algorithm described here is programmatic, manual adjustments in the filtering-editing process can also be accommodated using a multimedia editing user interface as is known in the art.

In steps 705 and 706, the filtered content is replayed to the subject while requesting feedback on the observations, reactions, and/or responses of the subject. The feedback can solicit, for example, identifications of persons and subjects of presented multimedia content. Since the metadata associated with the recorded and the replayed content contains corresponding personal and subject identifiers, this process 700, in step 706, can rate or otherwise qualify or metricize the accuracy of the provided feedback. This rating is then evaluated at step 707 following re-exposure of the subject to the selected record of the episode.

In this evaluation step, when the evaluation function determines that the subject's ability to recollect a satisfactory quantity and/or quality of details, step 711 provides for archiving the captured event content along with the records of re-exposing the subject to the filtered content (which can include, for example, the records of the corresponding and evaluated responses of the subject). The subject's responses can be stored in textual form, in the form of abstracted response notations, in the form of the multimedia records of the responses themselves, or as the combination of several of these forms.

This archive can later be reused as described below when refreshing the subject's memory immediately prior to future calendar events that were linked to the evaluated event using the matching calendar data in step 702.

If in step 707 the process 700 determines that the subject was not able to demonstrate a sufficient level of success with respect to recalling the re-exposed content, the script for replaying the content and for requesting identification feedback and for evaluating the response can be automatically modified at step 708. By one approach this modification can serve to make the identification easier for the subject. This can comprise, for example, providing more cues, more repetitions, and/or more time to recollect between subsequent portions of the replayed content. A new script might even rearrange the portions of the event content stream such that related persons, subject fragments, and so forth are grouped in a manner that can assist with facilitating recollection through association.

This content modification function can be accomplished through use of programmed heuristics, manually, or by a combination of manual and programmatic heuristics where the programmatic functions assist the manual steps with respect to composing the new sequence of presentations and response solicitations. In step 709 the feasibility of the new script is evaluated. If this inquiry reveals that even in the case of the best possible responses by the subject the convergence factor of recollections are not high enough to reliably permit recognizing the immediate post-event recollections, in which case this content/script is arguably not worth archiving for the purpose of future pre-event recaps for related future events, the process 700 proceeds to step 710, which essentially serves to skip the event content recap archiving step 711. After performing step 710, the content capturing and replaying results for this particular episode are not retained for use with future pre-event recaps.

Otherwise, in steps 705 through 707, the replay, feedback solicitation and evaluations steps are repeated according to the new and easier script. This iterative process continues until a recollection process is evaluated in step 707 as being successful. In this case, the process 700 proceeds to step 711 where the content captured during the episode and during the post-event recap process is archived for the purpose of future reuse as disclosed below.

Figure 8:
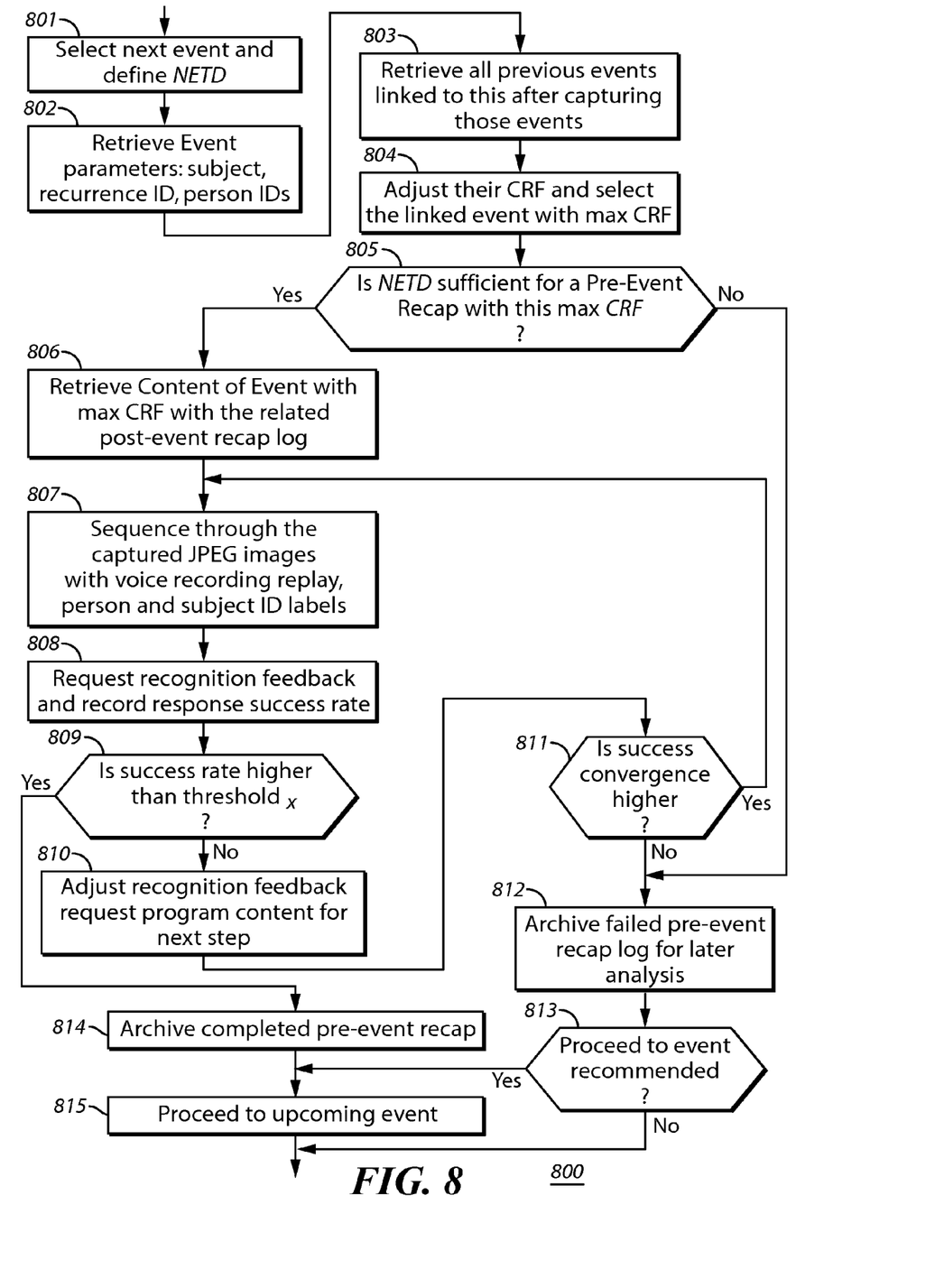
FIG. 8 comprises a flow diagram as configured in accordance with various embodiments of the invention.

Referring now to FIG. 8, in step 801 of the pre-event recap process 800, the device 500 selects the next event on the primary device user's calendar and determines whether there is sufficient time for completing the pre-event recap process before the scheduled start of the event. For this purpose, the NETD factor is calculated in a manner similar to the post-event recap initial steps described above. From the located calendar event description, in step 802, the process 800 retrieves the parameters of this event. This can include, but is not limited to, the event subject, the event recurrence identifier, and the identifiers of the persons who are also scheduled to participate in the event.

In step 803, the process 800 determines what other previous events are linked to this next event. These links were established in the process of conducting the post event content recap 700 (at step 702), when the recurrent events matching the just-completed event were determined in order to calculate the CRF value of the completed event. At step 804, the CRF value of each previously linked event is adjusted to reflect the context proximity of that event to the next event of the calendar. Then, the previously linked event with the maximum CRF value is selected, because this is a previous, related event having corresponding captured content that appears to be most useful to recap the context of the upcoming event based on the logged experiences of the previous events.

Those skilled in the art can apply variation of this solution, such that the pre-event recap process can also be accomplished by combining the logged content of several previously experienced and related events. For simplicity, this illustrative example provides for selecting only one of these events that has the maximum adjusted CRF value.

In step 805, the process 800 determines whether there is enough time before the start of the next event to conduct a meaningful pre-event recap process by comparing the NETD and the selected maximum previous event CRF value. This is similar to the sufficient time determination for the post-event recap process as shown in step 703 above. If there is not enough time to do a successful pre-event recap, the process 800 automatically determines at step 813 whether participation in the upcoming event is recommended for this individual. When true, this process 800 recommends that the individual proceed to the next event and the device 500 then continues with the event content capturing process 600 described above.

These teachings will optionally accommodate having the device 500 apply one or more policies to make this determination regarding whether participation in the upcoming event should take place after a failed pre-event recap. This policy can weigh a variety of factors including such things as the potential negative psychological (or other) impact on the subject, the burden or impact on other participants of the planned event, on the cost of the event and/or future events, and so forth.

These teachings will also accommodate, if desired, using other, lower rated event materials under circumstances. For example, if there is not sufficient time left until the next event for the pre-event recap process when using the selected maximum previous, related event CRF value, the process 800 can consider using instead another related previous event having, for example, the second largest CRF value. The process 800 can then check again to determine if the corresponding time for the pre-event recap is now sufficient or not. This iterative process of trying to find an appropriate, previous related event can continue until a previous related event is found that has a low enough CRF value as will correspond to a short enough pre-event recap process time while still enabling a sufficiently positive content retention reinforcement impact. In this illustrative example, however, the solution is based on the approach of taking the previous related event with the maximum CRF value and then iteratively simplifying the interview script until the pre-event recap process is short enough while the short-term content retention reinforcement impact remains positive enough.

When there is sufficient time to conduct a satisfactory pre-event recap, at step 806 the process 800 retrieves the archived content of the previously linked event selected for its maximum CRF factor. In steps 807 through 811 the recap process is executed in a manner that is similar to the equivalent recap steps described above for the post-event recap process steps 705 through 709. If at step 809 the process 800 detects a successful completion of the pre-event recap process, it proceeds to step 814 to archive the pre-event recap content log and to proceed to the participation and event content capture process 600 for the upcoming event.

If at step 811 the process 800 determines that the pre-event recap process is not converging to a successful completion, the process 800 terminates the pre-event recap process. At step 812 the process 800 then provides for archiving the failed pre-event recap process content log for potential future analysis.

At step 813, the process 800 determines whether there is a sufficient expectation of benefit should the individual proceed to the upcoming event. These teachings will readily accommodate applying one or more policies to determine if participation in the event should take place after a failed pre-event recap. Such a policy can again weigh several factors to facilitate the making of such a determination, such as the potential negative impact on the subject, the impact on other participants of the planned event, the cost of the event, and so forth.

When the transition to the next event is not required, this process 800 exits without initiating the recording process for the next event participation. The process can also provide for outputting a message to the device user(s) to indicate that participation is not recommended. Otherwise, the process 800 can proceed to step 815 to begin the next event participation with event content capturing as described above with respect to FIG. 6.

In the illustrative example provided above, a single integrated platform (the mobile device (500) performs all of the described steps, actions, and functions. Those skilled in the art will recognize that other possibilities are available in this regard. This can include, for example, distributing some of the described functions across the mobile device and other processing platforms that are available through the network of a wireless infrastructure.

Figure 4:
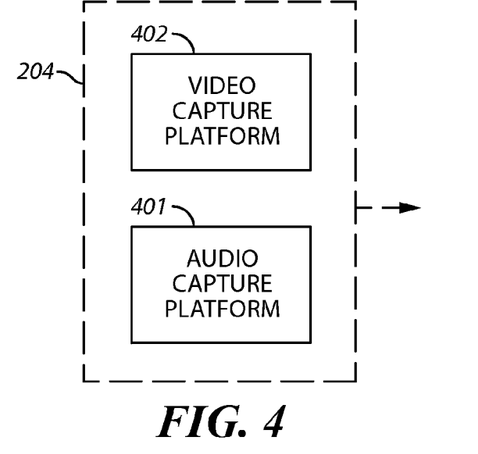
FIG. 4 comprises a block diagram as configured in accordance with various embodiments of the invention.

By one approach, such a distribution of functionality can include the implementation of such functions in a wearable Bluetooth network, wherein the video capture platform 402, the audio capture platform 401, the display 302, the user input device 301 and the rest of the hardware including the processor 201, the memory 202, the location determination unit 206 and the clock 203 reside in physically separate devices around the body of the subject.

By another approach, if desired, the processor 201 and/or the memory 202 has connected, remotely centralized and higher capacity extensions. The remote processor extension can facilitate the execution of highly computationally intensive correlation analysis and pattern recognition functionality for calculating the CRF factors, for applying heuristics to determine termination conditions in the iterative re-cap dialogs, and/or to determine the feasibility of proceeding to the subject's attendance at the next, recurrent calendar event.

The remote location and/or extension of the end user interface function devices can facilitate the support of the long-term recollection encouragement process by live caretaker personnel if desired.

Regardless of whether the interviewing function is located remotely or not, live caretaker personnel can take part in the interviewing process by complementing or by entirely substituting for one or more of steps described at steps 704 through 709.

So configured, those skilled in the art will recognize and appreciate that these teachings provide a powerful and effective way to facilitate the useful retention of experiential recollections by people who otherwise experience considerable challenges in these regards. These teachings are readily employed in conjunction with commonly available technologies in a manner that can successfully leverage their individual contributions in efficient and useful ways. It will also be appreciated that these teachings can be deployed in a highly automated manner, thereby freeing caregivers to use their time in other ways that are helpful to the individuals receiving the benefits of these teachings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. One such modification may comprise various ways of automating the recap interview process by applying voice recognition user interface technologies in combination with or instead of user interface buttons on the mobile device or by employing text-to-speech technologies in the steps of communicating to the primary device user. Another example of a modification would comprise the employment of artificial intelligence dialog systems. As yet another example, automated dialog scripts and rules, termination condition determination rules in the dialog process, and transition gating rules relating to the subsequent, recurrent event after the re-cap dialog can be further customized for better efficiency based on a persona model of the interviewed subject patient as described above. By one approach, the persona model can be introduced manually by subject matter expert professionals. As another approach in this regard, the persona model can be built by employing automated personality profiling techniques. Such personality profiling can also be accomplished by analyzing the multimedia personal experience content captured by the same mobile device through which the interviewing process is conducted.

I claim:

1. An apparatus for use with an individual who faces long term memory challenges comprising:
   a memory;
   an experience capture interface;
   an end user interface;
   a single processor operably coupled to the memory, the experience capture interface, and the end user interface, and being configured and arranged to:
      automatically capture a record of experiential content to which the individual is exposed during a given episode and store the record in the memory;
      automatically associate the record of experiential content with metadata that characterizes the given episode;
      automatically use the record of experiential content to re-expose the individual, via the end user interface, to at least portions of the given episode to thereby encourage development of a long term recollection of at least a portion of the given episode by:
         requesting feedback from the individual regarding at least one subject of the given episode while re-exposing the individual to the record of experiential content;
         assessing accuracy of the feedback as a function, at least in part, of the metadata for the record of experiential content to metricize the accuracy of the feedback;
         evaluating the individual's memory as a function, at least in part, of the metricized accuracy of the feedback.

2. The apparatus of claim 1 wherein the record of experiential content comprises both audio content and visual content.

3. The apparatus of claim 1 wherein the processor is configured and arranged to automatically associate the record of experiential content with metadata that characterizes the given episode by, at least in part, automatically accessing a calendar for the individual and using information in the calendar as the metadata.

4. The apparatus of claim 1 wherein the processor is configured and arranged to automatically use the record of experiential content to re-expose the individual to at least portions of the given episode by, at least in part, re-exposing the individual to at least portions of the given episode within a relatively short period of time following a conclusion of the given episode.

5. The apparatus of claim 4 wherein the processor is configured and arranged to re-expose the individual to at least portions of the given episode within a relatively short period of time following a conclusion of the given episode by, at least in part, determining an extent of re-exposing the individual to at least portions of the given episode within a relatively short period of time following a conclusion of the given episode.

6. The apparatus of claim 1 wherein the processor is configured and arranged to automatically use the record of experiential content to re-expose the individual to at least portions of the given episode by, at least in part, re-exposing the individual to at least portions of the given episode shortly prior to the individual being exposed to a subsequent similar episode.

7. The apparatus of claim 6 wherein the processor is configured and arranged to re-expose the individual to at least portions of the given episode shortly prior to the individual being exposed to a subsequent similar episode by also re-exposing the individual to at least portions of other previously captured episodes as a function, at least in part, of a determined degree of similarity between the given episode and the other previously captured episodes.

8. The apparatus of claim 1 wherein the processor is configured and arranged to automatically use the record of experiential content to re-expose the individual to at least portions of the given episode to thereby encourage development of a long term recollection of at least a portion of the given episode by, at least in part, automatically abridging the record of experiential content to re-expose to the individual by, at least in part, reducing a re-exposure to redundant experiential content.

9. The apparatus of claim 1 wherein the processor is configured and arranged to automatically use the record of experiential content to re-expose the individual to at least portions of the given episode to thereby encourage development of a long term recollection of at least a portion of the given episode by, at least in part:
  receiving feedback from the individual with respect to the record of experiential content to which the individual is re-exposed;
  automatically evaluating the feedback, at least in part, by comparison with the metadata.

10. The apparatus of claim 9 wherein the processor is configured and arranged:
  automatically effect early termination of re-exposing the individual to at least portions of the given episode when automatically evaluating the feedback indicates insufficient progress with respect to developing the long term recollection.

* * * * *